United States Patent [19]

Mitsuda et al.

[11] 4,118,976
[45] Oct. 10, 1978

[54] SWITCH DEVICE FOR DETECTING A POSITION OF A THROTTLE VALVE OF AN INTERNAL COMBUSTION ENGINE

[75] Inventors: Tadao Mitsuda, Susono; Takeru Yasuda, Nagoya; Sigeru Okuda, Aichi, all of Japan

[73] Assignee: Toyota Jidosha Kogyo Kabushiki Kaisha, Toyota, Japan

[21] Appl. No.: 859,564

[22] Filed: Dec. 12, 1977

[30] Foreign Application Priority Data

Jun. 23, 1977 [JP] Japan ............................ 52/073886

[51] Int. Cl.² .................................... G01M 15/00
[52] U.S. Cl. ............................. 73/118; 123/119 EC
[58] Field of Search ............... 73/118; 200/DIG. 17, 200/153 T, 153 V, 337; 74/854, 855, 877; 116/124 A; 60/290; 123/32 EA, 32 EL, 119 EC; 261/DIG. 74; 340/271

[56] References Cited

U.S. PATENT DOCUMENTS 3,751,916  8/1973  Hayashida et al. ............... 60/290 X
3,933,952  1/1976  Elmore ..................... 261/DIG. 74 X

*Primary Examiner*—Jerry W. Myracle
*Attorney, Agent, or Firm*—Stevens, Davis, Miller & Mosher

[57] ABSTRACT

Disclosed herein is a switch device adapted for attaching to a carburetor of an internal combustion engine for detecting a predetermined position of a throttle valve of the carburetor. A lever mechanism which can be moved together with the throttle valve is arranged on the carburetor. The lever mechanism cooperates with a limit switch when the throttle valve is situated at a predetermined position. Thus, an electrical signal indicating the predetermined position is obtained from the limit switch.

3 Claims, 1 Drawing Figure

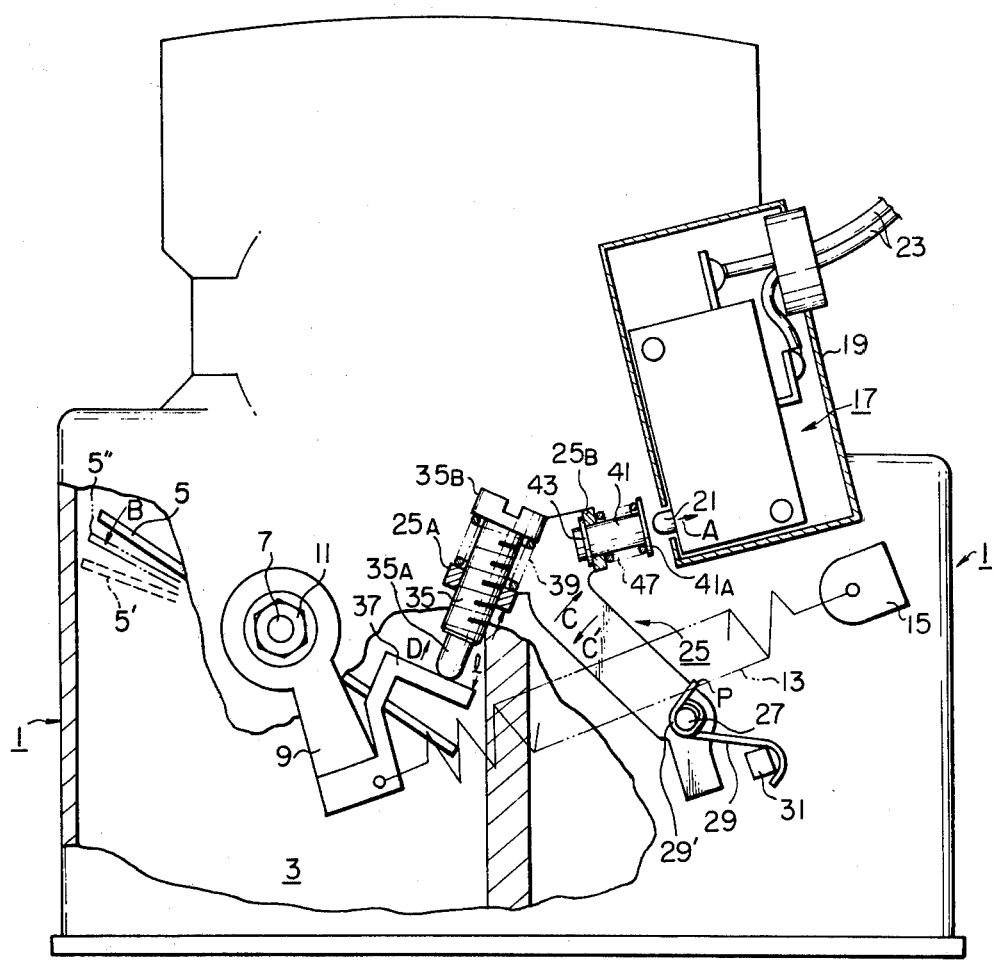

SWITCH DEVICE FOR DETECTING A POSITION OF A THROTTLE VALVE OF AN INTERNAL COMBUSTION ENGINE

FIELD OF THE INVENTION

The present invention relates to a switch device which can provide an electric signal for indicating a predetermined position of a throttle valve of a carburetor of an internal combustion engine.

BACKGROUND OF THE INVENTION

In a known system for cleaning the exhaust gas of an internal combustion engine, a sensor adapted to provide an electric signal is utilized for detecting the opening of a throttle valve of the engine. In the prior art, a so-called vacuum switch has been used to carry out the function of the above-mentioned sensor. This vacuum switch has a diaphragm which is mechanically connected to a switch mechanism and which forms a vacuum chamber opened to the intake line of the engine. The diaphragm operates to cause the switch mechanism to provide an electric signal when a vacuum level in the intake system of the engine reaches a predetermined value for detecting a predetermined position of the throttle valve.

However, this type of switch has a drawback in that the position of the throttle valve cannot be accurately detected, because the level of the vacuum in the intake passageway does not correspond precisely to the position of the throttle valve. Due to this drawback, an ideal operation of the exhaust gas cleaning apparatus cannot be obtained. Therefore, a large amount of toxic components is exhausted into the atmosphere without being cleaned.

SUMMARY OF THE INVENTION

An object of the present invention is to provide a switch device, capable of correctly detecting a predetermined position of a throttle valve of an internal combustion engine.

Another object of the present invention is to provide a switch device which can be incorporated into a system for cleaning the exhaust gas of an internal combustion engine.

In order to attain these objects, a switch device is provided, which device is adapted for attaching to an air horn of a carburetor of an internal combustion engine for detecting a position of a throttle valve arranged in an intake air passageway formed in the air horn, the throttle valve having a pivot axis which is rotatably supported by the horn and being urged by a spring means so that the throttle valve can normally close off the intake air passageway. According to the present invention, such a switch device comprises: a limit switch mounted on the air horn, which limit switch comprising a push button member capable of being displaced to operate the limit switch when an external force is applied to the push button member; a first pusher member integrally secured to one end of the pivot axis of the throttle valve, extending out of the air horn, so that the first pusher member is moved together with the movement of the throttle valve; a lever member which is, on one end thereof, rotatably mounted to the air horn; an abutment member mounted on a free end of the lever member remote from the one end, the lever member being urged by a spring so that said lever member is rotated about the one end in response to the rotational movement of the throttle valve; a second pusher member mounted on the free end of the lever member near to the abutment member, the second pusher member being cooperable with the push button of the limit switch in such a manner that the second pusher member is caused to contact the push button for operating the limit switch when the lever member is rotated so that the second pusher member is moved toward the push button, due to the rotation of the throttle valve, and; a means for effecting the adjustment of a predetermined position of the throttle valve by causing the second pusher member to touch the push button at the predetermined position to cause the limit switch to operate.

DESCRIPTION OF A PREFERRED EMBODIMENT

In an attached drawing illustrating an outside portion of a carburetor of an internal combustion engine, numeral 1 designates an air horn which forms an intake air passageway 3 therein. A throttle valve 5 is arranged in the passageway in order to control the amount of air fuel mixture passing through the passageway 3 toward an intake manifold (not shown). The throttle valve 5 has a pivot axis 7 which is rotatably supported by the air horn 1. One end of a throttle returning lever 9 is attached onto one end of the pivot axis 7 extending out of the air horn 1 by means of a nut 11. The other end of the throttle returning lever 9 is connected by means of a coil spring 13 to a lug member 15 integrally formed on the air horn 1. Thus, the spring 13 urges the lever 9 so that the throttle valve 5 is rotated in a counterclockwise direction as shown by an arrow B to cause the throttle valve to close the passageway 3. The pivot axis 7 is connected to an accelerator pedal (not shown) in order to open the throttle valve 5 against the force generated by the returning spring 13. In the drawing, a fully closed position of the throttle valve 5 is shown by a dotted line 5'.

A limit switch 17, adapted to provide an electrical signal indicating the opening of the throttle valve 5 (as will be described later), is accommodated in a case 19 which is secured to the horn 1 by a means which is not shown in the drawing. The limit switch 17, which is per se well known, has a push button 21 capable of being displaced by a force applied thereto in a direction shown by an arrow A to cause a switch mechanism in the switch 17 to provide an ON signal or an OFF signal from electrical wires 23 connected to the switch mechanism.

A switch operating lever 25 is situated between the throttle returning lever 9 and the limit switch 17. The lever 25 is, on one end thereof, rotatably attached to a pin 27 which is secured to the air horn 1. A return spring 29 has a coil portion 29' which is inserted to the pin 27. One end of the spring 29 is engaged with a lug member 31 formed integrally on the horn 1, whereas the other end of the spring 29 is engaged with the lever 25 at a position shown by P. As a result, the spring 29 can cause the lever 25 to rotate in a counterclockwise direction as shown by an arrow C'.

The switch operating lever 25 is bent at a free end thereof remote from the pin 27 to form a projected portion $25_A$. An adjusting screw 35 is screwed to a threaded hole formed in the projected portion $25_A$. The screw 35 has an abutment portion $35_A$ which contacts a pusher plate 37 which is welded to the end of the throttle returning lever 9 remote from the axis 7. A spring 39 is disposed between the portion $25_A$ and a head portion $35_B$ of the screw 35 for immobilizing the screw 35 at a predetermined position.

The lever 25 has another projected portion $25_B$ located near the above-mentioned portion $25_A$. A pusher member 41 for operating the limit switch 17 is slidably inserted into the portion $25_B$. A collar portion 43 is formed on the member 41. A spring 47 is disposed between the portion $25_B$ and a head flange $41_A$ of the pusher member 41 to cause the collar portion 43 to become engaged with the projected portion $25_B$. The head flange $41_A$ is arranged so that it faces the push button 21 of the limit switch 17. The force of the spring 47 is determined to be slightly larger than a force which is necessary to cause the push button 21 to be displaced as shown by the arrow A. As a result, the limit switch 17 can be operated by the pusher member 41.

When the accelerator pedal (not shown) is released, the throttle valve 5 together with the throttle returning lever 9 is, by a force caused be the spring 13, moved in the counterclockwise direction as shown by the arrow B toward the idle portion 5'. This movement causes the switch operating lever 25 to be moved in the clockwise direction as shown by an arrow C, since the pusher plate 35, which is integral with the throttle returning lever 9, pushes the abutment portion $35_A$ of the screw 35 as shown by an arrow D. Due to the movement of the lever 25 as shown by the arrow C, the pusher member 41, carried by the lever 25 moves toward the push button 21 of the limit switch 17, touches the button 21 and displaces the button 21 as shown by the arrow A. (It should be noted that the force of the spring 47 is slightly higher than the force which is necessary to displace the button 21.) Due to the movement of the push button 21, the switch mechanism (not shown) connected to the button 21 is switched to its ON or OFF condition, when the throttle valve 5 is returned, as shown by the arrow B, to a predetermined position, for example, to a position as shown by a phantom line 5". Accordingly, an electrical signal can be issued to the electric wires 23 for indicating that the throttle valve is situated at the predetermined position 5". Such signals are received by an exhaust gas cleaning apparatus (not shown). When the throttle valve is further moved to the idle position 5' from the position 5" at which the limit switch 17 is being operated, the lever 25 continues to move in the clockwise direction C. The movement of the lever 25 does not cause the pusher member 41 to move, since the spring 47 urging the pusher member 41 is elastically deformed by a further movement of the lever 25 in the clockwise direction to permit the portion $25_B$ to slide on the pusher member 41. Thus, the generation of an undue force in the switch mechanism, is prevented from destroying the switch 17. It should be noted that this operation of the spring 47 is possible because the force of the spring 47 is selected to be slightly higher than the force which is necessary to displace the push button 21 of the limit switch 17.

In order to control a predetermined position at which the limit switch 17 is operating, a length between the position $25_A$ and the pusher plate 37 is changed by rotating the screw 35. Accordingly, the more the length $l$ is increased, the wider an opening of the throttle valve which is detected by the limit switch will become.

Although the embodiment herein as illustrated with reference to the accompanying drawing, however, many modifications can be made by those skilled in this art without departing from the scope and spirit of the invention.

What is claimed is:

1. A switch device adapted for attaching to an air horn of a carburetor of an internal combustion engine for detecting a position of a throttle valve arranged in an intake air passageway formed in said air horn, said throttle valve having a pivot axis which is rotatably supported by said horn, said throttle valve being urged by a spring means so that said throttle valve can normally close off said intake air passageway, said switch device comprising:

a limit switch mounted on said air horn, said limit switch comprising an operating member displaceable for operating said limit switch, when an external force is applied to said operating member;

a first pusher member integrally secured to one end of said pivot axis of said throttle valve, said axis extending out of said air horn, so that said first pusher member is moved together with the movement of said throttle valve;

a lever member which is, on one end thereof, rotatably mounted to said air horn;

an abutment member mounted on a free end of said lever member remote from said one end, said lever member being urged by a spring so that said abutment member is always in contact with said first pusher member to cause said lever member to be moved together with said throttle valve;

a second pusher member mounted on said free end of said lever member near to the abutment member, said second pusher member cooperable with said operating member of said limit switch in such a manner that said second pusher member is in contact with said operating member to cause said limit switch to be in operation when said lever member is rotated so that said second pusher member is moved toward said operating member due to the rotation of said throttle valve, and;

means for effecting the adjustment of a predetermined position of said throttle valve, said second pusher member being in touch with the operating member at said predetermined position to operate said limit switch.

2. A switch device according to claim 1, wherein said means comprises a screw thread formed on said abutment member, said second lever having a threaded hole for accommodating said screw thread.

3. A switch device according to claim 1, wherein, said second pusher member is provided with a spring means to prevent an undue force from being applied to said operating member of said limit switch.

* * * * *

UNITED STATES PATENT AND TRADEMARK OFFICE
CERTIFICATE OF CORRECTION

PATENT NO. : 4,118,976
DATED : October 10, 1978
INVENTOR(S) : Tadao MITSUDA et al It is certified that error appears in the above-identified patent and that said Letters Patent are hereby corrected as shown below:

Please insert the name of the additional Assignee as listed below:

-- AISAN INDUSTRY CO., LTD., Japan--

Signed and Sealed this

Twenty-seventh Day of February 1979

[SEAL]

Attest:

RUTH C. MASON
Attesting Officer

DONALD W. BANNER
Commissioner of Patents and Trademarks